United States Patent [19]

Holle et al.

[11] Patent Number: 5,174,817
[45] Date of Patent: Dec. 29, 1992

[54] PROCESS FOR THE CALCINATION OF FILTER CAKES WITH HIGH SOLIDS CONTENTS BEING PARTLY PRE-DRIED IN A DIRECTLY HEATED ROTARY KILN

[75] Inventors: Bernd-Michael Holle; Peter Beumer; Rolf M. Braun; Hilmar Rieck, all of Krefeld; Jürgen Kischkewitz, Ratingen; Gerhard Wiederhöft, Krefeld, all of Fed. Rep. of Germany

[73] Assignee: Bayer Aktiengesellschaft, Leverkusen, Fed. Rep. of Germany

[21] Appl. No.: 539,759

[22] Filed: Jun. 18, 1990

[30] Foreign Application Priority Data

Jun. 29, 1989 [DE] Fed. Rep. of Germany ....... 3921262

[51] Int. Cl.$^5$ .................... C09C 1/36; C09C 3/00; C09C 3/04
[52] U.S. Cl. .................... 106/401; 106/400; 106/425; 106/437; 106/453; 106/456; 423/610; 501/126; 501/132; 501/134
[58] Field of Search ............ 423/610; 106/437, 425, 106/453, 456, 400, 401; 501/126, 132, 134

[56] References Cited

U.S. PATENT DOCUMENTS

| | | | |
|---|---|---|---|
| 3,336,104 | 8/1967 | Miller | 423/315 |
| 3,937,797 | 2/1976 | Romanski et al. | 423/610 |
| 3,981,978 | 9/1976 | Weiler et al. | 423/610 |
| 4,427,451 | 1/1984 | Baloga | 106/436 |
| 4,717,559 | 1/1988 | Cummings et al. | 423/328 |
| 4,929,579 | 5/1990 | Lassiter | 501/133 |

FOREIGN PATENT DOCUMENTS

| | | |
|---|---|---|
| 2423983 | 12/1975 | Fed. Rep. of Germany . |
| 1516326 | 7/1978 | United Kingdom . |
| 2213497 | 8/1989 | United Kingdom . |

OTHER PUBLICATIONS

"Chemical Engineers' Handbook"; R. H. Perry; pp. 20-31, 20-32, McGraw-Hill, Fifth Ed., 1973.

Primary Examiner—Mark L. Bell
Assistant Examiner—Scott L. Hertzog
Attorney, Agent, or Firm—Sprung Horn Kramer & Woods

[57] ABSTRACT

A process for calcining a filter cake in a directly heated rotary kiln wherein part of the filter cake is separated from the entire mass of filter cake, the separated portion is predried and recombined with the remainder portion and the combined predried and remainder portion is calcined. The filter cake can be inorganic solids such as oxides of titanium, chromium (III), zinc and iron.

11 Claims, No Drawings

PROCESS FOR THE CALCINATION OF FILTER CAKES WITH HIGH SOLIDS CONTENTS BEING PARTLY PRE-DRIED IN A DIRECTLY HEATED ROTARY KILN

This invention relates to a process for the calcination of filter cakes in directly heated rotary kilns.

Directly heated rotary kilns are used in thermal processes for inorganic materials, totally different physical or chemical process steps, such as for example drying, crystallization or calcination, being carried out in the kilns. The feedstock comes into direct contact with the hot waste gases of the burner in the kiln. The hot waste gases may be moved in co-current with or countercurrent to the feedstock. The calcined material discharged from the kiln is generally called clinker. Directly heated rotary kilns are used inter alia in the manufacture of inorganic pigments. For example, the production of titanium dioxide pigments by the sulfate process is carried out as follows:

After digestion of the raw material with sulfuric acid, the digestion solution obtained is hydrolyzed at elevated temperature in the presence of water and suitable hydrolysis nuclei. The titanium dioxide hydrate obtained is successively filtered, washed, subjected to a reducing treatment in acidic medium, re-filtered and washed and, after the addition of various chemicals to control particle size, particle size distribution and utilization during the subsequent calcination step, is finally filtered again. The filter cake obtained is fed into a directly heated rotary kiln and calcined to clinker. Calcination is followed by further process steps, such as grinding, and optionally by chemical aftertreatments and micronization.

Since directly heated rotary kilns are operated at waste gas temperatures of, in some cases, above 1200° C. and air velocities of, in some cases, more than 15 m/sec. are reached, they can only be charged with agglomerated solids (for example pellets) or with filter cakes having a certain moisture content.

The filter cakes should have a high solids content to minimize energy consumption during calcination and to achieve a high throughput in the rotary kiln. On the other hand, the solids content of the filter cake should not be too high because otherwise the discharge of solids with the kiln gases from the directly heated rotary kiln would be too high. In addition, such an increase in the solids content of the filter cake beyond a certain solids content dependent on the nature of the filter cake involves disproportionately high energy and other costs.

At the present time, various press filters (for example membrane filter presses, rotary or belt filters with pressure rollers or belts) are used for the filtration process described above, enabling the filter cake to be substantially freed from water by application of pressure (cf. GB 1,516,326 and DE-A-2 423 983).

With filters such as these, it is possible, for example, to obtain solids contents in the titanium dioxide hydrate filter cake of, for example, 44-52% by weight. Distinctly higher solids contents cannot be achieved for the titanium dioxide hydrate, even where very high pressures are applied.

With other inorganic pigments, other solids contents can be obtained in the filter cake according to particle size, particle shape and chemical composition (for example: iron oxide yellow (FeOOH) approx. 30-40% by weight and iron oxide black ($Fe_3O_4$) approx. 60-70% by weight).

Accordingly, the object of the present invention is to provide a process by which the calcination of filter cakes fed into directly heated rotary kilns can be carried out with less energy consumption and/or higher capacity without any increase in the amount of dust discharged with the waste kiln gases.

The present invention relates to a process for the calcination of filter cakes in a directly heated rotary kiln, part of the filter cake being pre-dried before introduction into the directly heated rotary kiln and then being recombined with the rest of the filter cake.

Inorganic pigments or their precursors are particularly suitable for use as filter cakes in this process, including for example titanium dioxide hydrate which normally has a solids content of 37 to 52% by weight, depending on the filtration unit used and expressed as $TiO_2$.

In one particular embodiment of the process, part of the filter cake is pre-dried in a paste dryer with a stirred fluidized bed.

The part of the filter cake which is pre-dried preferably comprises 5 to 50% by weight, based on the filter cake as a whole.

The pre-dried part and the remainder of the filter cake are advantageously mixed in a ratio so that a friable, dust-free homogeneous mass is obtained.

This friable, dust-free, homogeneous mass which is calcined in the directly heated rotary kiln preferably has a solids content of 30 to 85% by weight.

The pre-dried part is mixed with the rest of the filter cake before introduction into the directly heated rotary kiln preferably in a separate kneader mixing unit or directly in the kiln feed screw.

The present invention also relates to inorganic solids produced by one of the variants of the process according to the invention, calcination normally being followed by grinding and, optionally, an aftertreatment and also micronizing.

Preferred inorganic solids are oxides, particularly titanium dioxide, chromium(III) oxide, zinc oxide and iron oxides.

The product obtained after calcination is normally called "clinker". This clinker is subsequently ground, optionally in the presence of grinding aids. Grinding may be followed by a so-called aftertreatment comprising the following steps: paste formation, optionally in the presence of dispersion aids, subsequent addition of the organic or inorganic aftertreatment agents to the paste (including, for example, phosphorus, aluminum, silicon and zirconium compounds), filtration, washing, drying and micronizing to aftertreated pigments It is possible through the process according to the invention to increase throughput in the directly heated rotary kiln and/or to reduce energy consumption in that the solids content of the filter cakes fed into the kiln is increased in an energy-favorable manner outside the rotary kiln.

In the process according to the invention, part of the filter cake is dried in an energy-favorable manner in corresponding units, normally at product temperatures of 80° to 150° C. This part of the filter cake, which accumulates in the form of a powder after drying, is then mixed with the rest of the filter cake in such a way that the resulting mass is homogeneous and friable. In the case of titanium dioxide hydrate, the solids content of the filter cake can thus be increased to around 65%.

This procedure also eliminates any risk of the filter cake being prematurely discharged from the directly heated rotary kiln under the effect of the high kiln gas velocities. The pre-dried part and the rest of the filter cake may be mixed either in conventional kiln feeders (screws) or in a preceding kneader mixing unit. In the production of titanium dioxide pigments, a product of relatively high quality (better relative lightening power, greater lightness) is surprisingly obtained where the process according to the invention as described in the foregoing is applied.

The invention is illustrated by the following Examples.

EXAMPLE 1

An aqueous suspension of titanium dioxide hydrate obtained by the known sulfate process for the production of titanium dioxide pigments has a solids content of 28% by weight (expressed as $TiO_2$). This suspension is filtered through a rotary filter with an additional pressure belt. The filter cake obtained has a solids content of 44% by weight (expressed as $TiO_2$).4.9 t of the filter cake per hour are fed into a paste dryer via a paste tank. The paste dryer is heated with waste gas via a combustion chamber. 2.6 t dry material having a solids content of 83% by weight (expressed as $TiO_2$) are removed hourly from the tube filter of the paste dryer and fed by a screw conveyor to the feed chute of a directly heated rotary kiln. The rotary kiln is directly heated with natural gas in countercurrent to the feedstock via a combustion chamber. 10.2 t/h filter cake having a solids content of 44% by weight (expressed as $TiO_2$) is fed into the feed chute of the rotary kiln at the same time as the dry material. The feed chute of the rotary kiln opens into the kiln feed screw. In the kiln feed screw, the dry material from the paste dryer and the filter cake are mixed in such a way that a homogeneous friable mass (12.8 t/h) having a solids content of 52% by weight (expressed as $TiO_2$) is introduced into the kiln. The waste gas (46,200 $Nm^3/h$) issuing from the rotary kiln has a dust content of 5.6 $g/Nm^3$ which is no higher than in normal operation using a filter cake having a solids content of 44% by weight (expressed as $TiO_2$). If the predried material is fed into the rotary kiln without being mixed with the rest of the filter cake or if the rest of the filter cake is fed into the rotary kiln without preliminary mixing, a dust output of 46 $g/Nm^3$ and more from the kiln is observed.

For an input of 12.8 t/h of the above-mentioned mixture of filter cake and dry material, 6.4 t/h pigment clinker with better properties than a clinker produced by known calcination processes (relative lightening powder 635 as opposed to 600 and lightness 93.1 as opposed to 92.9) are discharged from the rotary kiln. Compared with the normal procedure using a filter cake of 44% by weight, based on $TiO_2$, the calcination capacity of the rotary kiln was increased by 23%.

EXAMPLE 2

An aqueous suspension of iron oxide black ($Fe_3O_4$) obtained by the known aniline process has a solids content of 30% by weight (expressed as $Fe_3O_4$). This suspension is filtered through a rotary filter. The filter cake obtained has a solids content of 65% by weight (expressed as $Fe_3O_4$). 1.83 t of the filter cake are fed hourly into a paste dryer via a paste storage tank. The paste dryer is heated with waste gas via a combustion chamber. 1.25 t dry material having a solids content of 95% by weight (expressed as $Fe_3O_4$) are removed hourly from the tube filter of the paste dryer and mixed in a separate kneader with 1.25 t/h filter cake having a solids content of 65% by weight (expressed as $Fe_3O_4$). 2.5 t/h of a homogeneous, friable mass having a solids content of 80% by weight (expressed as $Fe_3O_4$) pass from the kneader into the feed screw of the directly heated rotary kiln. In the rotary kiln, the material is dried and subjected to a chemical transformation ($Fe_3O_4 \rightarrow \alpha\text{-}Fe_2O_3$). Compared with the normal procedure using a filter cake of 65% by weight (expressed as $Fe_3O_4$), the overall energy consumption (total energy consumption of paste dryer and rotary kiln) was reduced by 15%.

What is claimed is:

1. A process for the calcination of a filter cake comprising a) filtering a raw material to form a filter cake, b) separating a part of the filter cake and pre-drying the separated part, c) combining the pre-dried separated part with the remainder of filter cake remaining after the separating, d) introducing the combined filter cake of c) into a directly heated rotary kiln and e) calcining the combined filter cake of c).

2. A process according to claim 1, wherein in step a) the filter cake is an inorganic pigment or a precursor thereof.

3. A process according to claim 2, wherein the filter cake is titanium dioxide hydrate.

4. A process according to claim 3, wherein the titanium dioxide hydrate has a solids content of 37 to 52% by weight, expressed as $TiO_2$.

5. A process according to claim 1, wherein the separated part of the filter cake is pre-dried in a paste dryer with a stirred fluidized bed.

6. A process according to claim 1, wherein the separate part is 5 to 50% by weight of the filter cake.

7. A process according to claim 1, wherein the pre-dried separated part and the remainder of the filter cake are mixed in a ratio so that a friable, dust-free homogeneous mass is obtained.

8. A process according to claim 7, wherein the friable, dust-free, homogeneous mass has a solids content of 30 to 85% by weight.

9. A process according to claim 1, wherein the pre-dried separated part is mixed with the remainder of the filter cake before introduction into the directly heated rotary kiln in a separate kneader mixing unit or directly in a kiln feed screw.

10. A process according to claim 1, further comprising grinding the calcined material of e).

11. The process according to claim 10, further comprising aftertreating and additionally micronizing the ground calcined material of e).

* * * * *